(12) United States Patent
Buttler

(10) Patent No.: US 11,885,658 B2
(45) Date of Patent: Jan. 30, 2024

(54) CONVERTING A DIRECTLY MEASURED MASS FLOW RATE TO ACCOUNT FOR BUOYANCY

(71) Applicant: MICRO MOTION, INC., Boulder, CO (US)

(72) Inventor: Marc Allan Buttler, Erie, CO (US)

(73) Assignee: MICRO MOTION, INC., Boulder, CO (US)

( * ) Notice: Subject to any disclaimer, the term of this patent is extended or adjusted under 35 U.S.C. 154(b) by 174 days.

(21) Appl. No.: 17/297,927

(22) PCT Filed: Dec. 17, 2018

(86) PCT No.: PCT/US2018/066039
§ 371 (c)(1),
(2) Date: May 27, 2021

(87) PCT Pub. No.: WO2020/131015
PCT Pub. Date: Jun. 25, 2020

(65) Prior Publication Data
US 2022/0026254 A1 Jan. 27, 2022

(51) Int. Cl.
*G01F 1/84* (2006.01)
*G01F 25/10* (2022.01)

(52) U.S. Cl.
CPC .............. *G01F 1/84* (2013.01); *G01F 25/14* (2022.01)

(58) Field of Classification Search
CPC .................... G01F 1/84; G01F 24/14
See application file for complete search history.

(56) References Cited

U.S. PATENT DOCUMENTS

| 5,335,552 A | * | 8/1994 | Hylton | G01F 25/14 73/861 |
| 8,915,145 B1 | | 12/2014 | Van Orsdol | |
| 2010/0217536 A1 | * | 8/2010 | Casimiro | G01F 1/849 702/45 |

OTHER PUBLICATIONS

Lief O. Olsen: "Introduction to liquid flow metering and calibration of liquid flowmeters", In: "NBS Technical Note 831", Jun. 1974 (Jun. 1974), U.S. Department of commerce / National Bureau of Standards, XP055615227.
Jodie G Pope et al: "NIST's Fully Dynamic Gravimetric Liquid Flowmeter Standard", Apr. 17, 2015 (Apr. 17, 2015), XP055615314, Retrieved from the Internet: URL:https://ws680.nist.gov/publicaiton/getpdf.cfm?pub_id=918213 [retrieved on Aug. 26, 2019].
OIML D28: "Conventional value of the result of weighing in air Contents", 2004, XP055615042, Retrieved from the Internet: URL:https://www.oiml.org/en/files/pdf_d/d028-e04.pdf [retrieved on Aug. 23, 2019].

* cited by examiner

*Primary Examiner* — Paul M. West
*Assistant Examiner* — Mark A Shabman
(74) *Attorney, Agent, or Firm* — The Ollila Law Group LLC

(57) ABSTRACT

A method of converting a directly measured mass flow rate to account for buoyancy is provided. The method includes directly measuring a mass flow rate of a material, measuring a density of the material, and using the measured density of the material to convert the directly measured mass flow rate into a mass value including a buoyancy of a fluid.

23 Claims, 5 Drawing Sheets

CONVERTING A DIRECTLY MEASURED MASS FLOW RATE TO ACCOUNT FOR BUOYANCY

TECHNICAL FIELD

The embodiments described below relate to converting a directly measured mass flow rate and, more particularly, to converting the directly measured mass flow to account for buoyancy.

BACKGROUND

Vibrating sensors, such as for example, vibrating densitometers and Coriolis flowmeters are generally known, and are used to measure mass flow and other information for materials flowing through a conduit in the flowmeter. Exemplary Coriolis flowmeters are disclosed in U.S. Pat. Nos. 4,109,524, 4,491,025, and Re. 31,450, all to J.E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no-flow through the flowmeter, a driving force applied to the conduit(s) causes all points along the conduit(s) to oscillate with identical phase or a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s). This measurement of the mass flow rate is a direct measurement of the mass of the material flowing through the conduit(s). This measurement of the mass is also not affected by buoyancy, in contrast to weigh scales, which can indicate different weights due to differences in density, as the following explains.

FIGS. 1A and 1B show a weigh scale WS that illustrates the effects of buoyancy. The effect of buoyancy acting on an object on the weigh scale WS during a test caused by the displacement of the air by the fluid is small, but it is measurable and predictable, as the following discussion illustrates. In FIG. 1A, a dense cylinder DC that has an actual weight of ten pounds is on the weigh scale WS. As can be seen, the weigh scale WS shows a reading of ten pounds, indicating that the buoyancy effect is negligible. FIG. 1B shows a less dense cylinder LC, such as a foam cylinder, on the weigh scale WS. The less dense cylinder LC also has an actual weight of ten pounds. However, due to the buoyancy effect, the weigh scale WS is indicating that the less dense cylinder LC weighs less than ten pounds. That is, air surrounding the less dense cylinder LC is applying a net upward force on the less dense cylinder LC due to the less dense cylinder LC displacing the air. For discussion purposes, the indicated weight shown in FIG. 1B may be 9.8 pounds and may be considered as "uncorrected for buoyancy."

When a user wishes to test a direct mass flow meter, such as a Coriolis flow meter, using a gravimetric method (e.g., the above described weigh scale), the difference in weight indications shown in FIGS. 1A and 1B may be problematic. This is because mass standards made of very dense material (e.g., steel) are typically used to calibrate a weigh scale. As a result, the amount of buoyance force acting on the calibration mass standards will be different than the amount of buoyance force acting on a fluid that is less dense because the fluid of equivalent mass will occupy much more air space than the mass standards, as the above discussion explains. Accordingly, there is a need to convert a directly measured mass flow rate to account for buoyancy.

SUMMARY

A method of converting a directly measured mass flow rate to account for buoyancy is provided. According to an embodiment, the method comprises directly measuring a mass flow rate of a material, measuring a density of the material, and using the measured density of the material to convert the directly measured mass flow rate into a mass value including a buoyancy of a fluid.

A meter electronics configured to convert a directly measured mass flow rate to account for buoyancy is provided. According to an embodiment, the meter electronics comprises an interface configured to receive sensor signals from a meter assembly, and a processing system communicatively coupled to the interface. The processing system is configured to directly measure a mass flow rate of a material in the meter assembly based on the received sensor signals, determine a density of the material, and use the determined density of the material to convert the directly measured mass flow rate into a mass value including a buoyancy of a fluid.

A system for converting a directly measured mass flow rate to account for buoyancy is provided. According to an embodiment, the system comprises a fluid sensor configured to measure one of a pressure and a density of a fluid, and a vibratory meter communicatively coupled to the fluid sensor. The vibratory meter is configured to directly measure a mass flow rate of a material, determine a density of the material, and use the determined density of the material to convert the directly measured mass flow rate into a mass value including a buoyancy of the fluid.

ASPECTS

According to an aspect, a method of converting a directly measured mass flow rate to account for buoyancy comprises directly measuring a mass flow rate of a material, measuring a density of the material, and using the measured density of the material to convert the directly measured mass flow rate into a mass value including a buoyancy of a fluid.

Preferably, the method further comprises using a density of the fluid to convert the directly measured mass flow rate into the mass value including the buoyancy of the fluid.

Preferably, the mass value including the buoyancy of the fluid comprises an indication by a weigh scale that has been calibrated using a mass standard in the fluid.

Preferably, the mass value including the buoyancy of the fluid comprises the mass value being uncorrected for the buoyancy of the fluid in which the mass value is gravimetrically determined.

Preferably, using the measured density of the material to convert the directly measured mass flow rate into the mass value including the buoyancy of the fluid comprises one of totalizing a plurality of the directly measured mass flow rates of the material and using the measured density of the material to convert the totalized directly measured mass flow rates to the mass value including the buoyancy of the fluid, and using the measured density of the material to convert one or more of the directly measured mass flow rates into one or more mass flow rate values including the buoyancy of the fluid.

Preferably, using the measured density of the material to convert the one or more directly measured mass flow rates into the one or more mass flow rate values further comprises totalizing the one or more mass flow rate values to the mass value including the buoyancy of the fluid.

Preferably, the mass standard is comprised of at least one of steel and a material that has the density of about 8.0 g/cm$^3$.

Preferably, the buoyancy of the fluid is a buoyancy of air.

Preferably, a Coriolis flow meter measures at least one of the mass flow rate and the density of the material.

According to an aspect, a meter electronics (20) configured to convert a directly measured mass flow rate to account for buoyancy comprises an interface (301) configured to receive sensor signals from a meter assembly (10), a processing system (310) communicatively coupled to the interface (301). The processing system (310) is configured to directly measure a mass flow rate of a material in the meter assembly (10) based on the received sensor signals, determine a density of the material, and use the determined density of the material to convert the directly measured mass flow rate into a mass value including a buoyancy of a fluid.

Preferably, the processing system (310) is further configured to use a density of the fluid to convert the directly measured mass flow rate into the mass value including the buoyancy of the fluid.

Preferably, the processing system (310) being configured to determine the density of the material comprises the processing system (310) being configured to one of receive a density measurement from a densitometer communicatively coupled to the interface (301) and measure a density of the material based on the received sensor signals.

Preferably, the mass value including the buoyancy of the fluid comprises an indication by a weigh scale that has been calibrated using a mass standard in the fluid.

Preferably, the mass value including the buoyancy of the fluid comprises the mass value being uncorrected for the buoyancy of the fluid in which the mass value is gravimetrically measured.

Preferably, the processing system (310) being configured to use the determined density of the material to convert the directly measured mass flow rate into the mass value including the buoyancy of the fluid comprises the processing system (310) being configured to one of totalize a plurality of the directly measured mass flow rates of the material and use the measured density of the material to convert the totalized directly measured mass flow rates to the mass value including the buoyancy of the fluid, and use the determined density of the material to convert one or more of the directly measured mass flow rates into one or more mass flow rate values including the buoyancy of the fluid.

Preferably, the processing system (310) being configured to use the measured density of the material to convert the one or more directly measured mass flow rates into the one or more mass flow rate values including the buoyancy of the fluid further comprises totalizing the one or more mass flow rate values to the mass value.

Preferably, the mass standard is comprised of at least one of steel and a material that has the density of about 8.0 g/cm$^3$.

Preferably, the buoyancy of the fluid is a buoyancy of air.

Preferably, a Coriolis flow meter includes the meter electronics (20).

According to an aspect, a system (600) for converting a directly measured mass flow rate to account for buoyancy comprises a fluid sensor (610) configured to measure one of a pressure and a density of a fluid, a vibratory meter (5) communicatively coupled to the fluid sensor (610). The vibratory meter (5) is configured to directly measure a mass flow rate of a material, determine a density of the material, and use the determined density of the material to convert the directly measured mass flow rate into a mass value including a buoyancy of the fluid.

Preferably, the meter (5) is further configured to use the density of the fluid to convert the directly measured mass flow rate into the mass value including the buoyancy of the fluid.

Preferably, the fluid sensor (610) is disposed proximate a weigh scale configured to measure a mass of the material measured by the vibratory meter (5).

Preferably, the fluid surrounds a weigh scale configured to measure a mass of the material measured by the meter (5).

BRIEF DESCRIPTION OF THE DRAWINGS

The same reference number represents the same element on all drawings. It should be understood that the drawings are not necessarily to scale.

DETAILED DESCRIPTION

FIGS. 2-6 and the following description depict specific examples to teach those skilled in the art how to make and use the best mode of embodiments of converting a directly measured mass flow rate to account for buoyancy. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of converting a directly measured mass flow rate to account for buoyancy. As a result, the embodiments described below are not limited to the specific examples described below, but only by the claims and their equivalents.

A directly measured mass flow rate is converted to account for buoyancy, such as conversion to an "apparent mass" or "mass in air," using a directly measuring mass flow meter, such as, for example a Coriolis flow meter. A density measurement is employed that can, for example, be provided by the Coriolis flow meter that can simultaneously measure mass and density. More particularly, the measured density of the material may be used to convert the directly measured mass flow rate into a mass value that includes a buoyancy of a fluid. The mass value is standardized to a mass standard (e.g., a standard kilogram) and the buoyancy of the fluid in which the mass standard is employed. The user may specify values for the density of the surrounding fluid (e.g., air) and the density of the mass standards that were used to calibrate the test weigh scale.

Figure 1A:
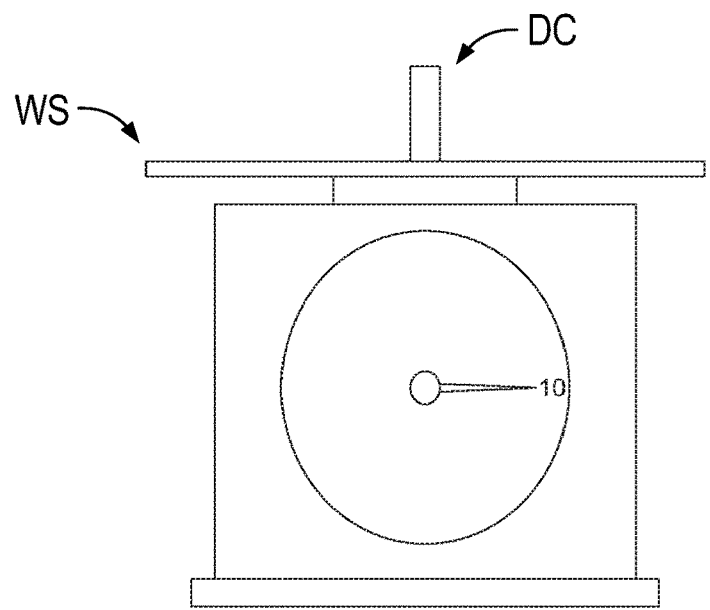
FIGS. 1A and 1B show a weigh scale WS that illustrates the effects of buoyancy.
Figure 1B:
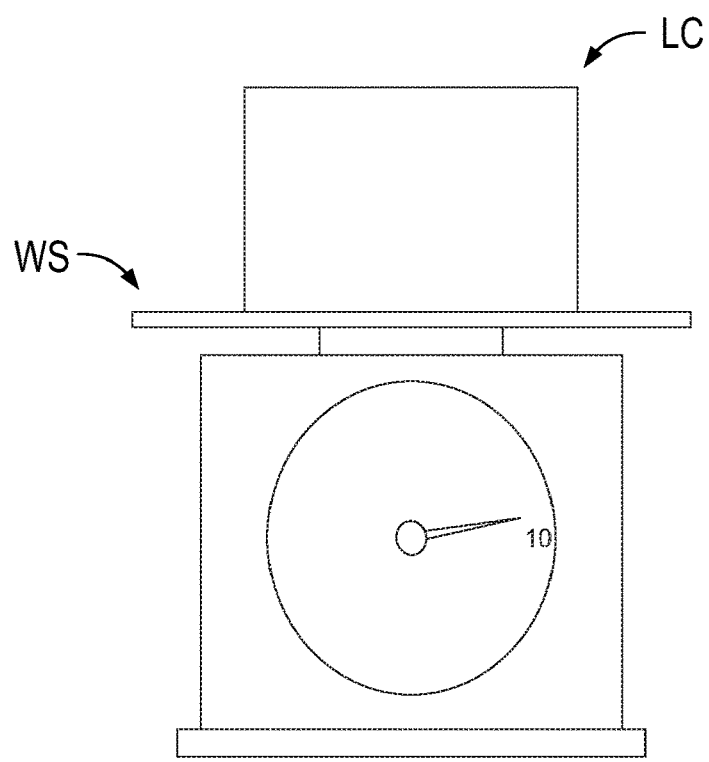

An electronics, such as a meter electronics in a Coriolis flow meter, can perform calculations to convert the directly measured mass flow and the measured density into an apparent mass flow rate and total. Accordingly, the apparent mass total from the Coriolis meter may match the mass total indicated by the weigh scale with no buoyancy correction applied to the scale indication, such as the scale indication shown in FIG. 1B. That is, the electronics could provide the value of 9.8 pounds shown in FIG. 1B and indicate that this value is uncorrected for buoyancy based on the directly measured true mass flow rates totalized to 10 pounds.

Figure 2:
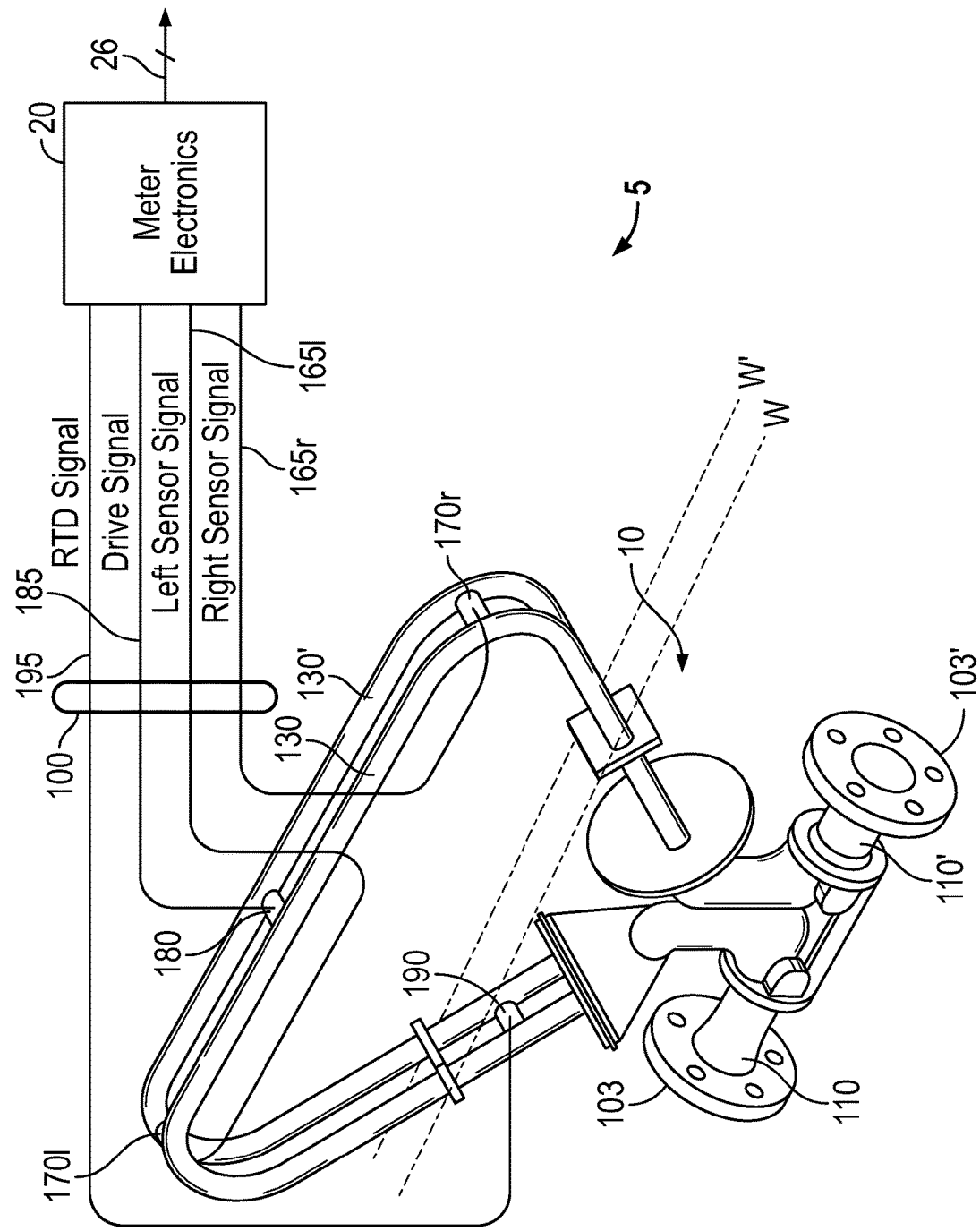
FIG. 2 illustrates an example of a vibratory meter 5 in the form of a Coriolis flowmeter comprising a meter assembly 10 and one or more meter electronics 20.

FIG. 2 illustrates an example of a vibratory meter 5 in the form of a Coriolis flowmeter comprising a meter assembly 10 and one or more meter electronics 20. The one or more meter electronics 20 are connected to meter assembly 10 to measure a characteristic of a flowing material, such as, for example, density, mass flow rate, volume flow rate, totalized mass flow, temperature, and other information.

The meter assembly 10 includes a pair of flanges 103 and 103', manifolds 110 and 110', and conduits 130 and 130'. Manifolds 110, 110' are affixed to opposing ends of the conduits 130, 130'. Flanges 103 and 103' of the present example are affixed to manifolds 110 and 110'. The conduits 130 and 130' extend outwardly from the manifolds in an essentially parallel fashion. When the meter assembly 10 is inserted into a pipeline system (not shown) which carries the flowing material, the material enters meter assembly 10 through flange 103, passes through inlet manifold 110 where the total amount of material is directed to enter conduits 130 and 130', flows through conduits 130 and 130' and back into outlet manifold 110' where it exits the meter assembly 10 through the flange 103'.

The meter assembly 10 includes a driver 180. The driver 180 is affixed to conduits 130 and 130' in a position where the driver 180 can vibrate the conduits 130, 130' in the drive mode. More particularly, the driver 180 includes a first driver component (not shown) affixed to conduit 130 and a second driver component (not shown) affixed to conduit 130'. The driver 180 may comprise one of many well-known arrangements, such as a magnet mounted to the conduit 130 and an opposing coil mounted to the conduit 130'. The driver 180 can receive a drive signal 185 from the meter electronics 20.

In the present example, the drive mode is the first out of phase bending mode and the conduits 130 and 130' are preferably selected and appropriately mounted to inlet manifold 110 and outlet manifold 110' so as to provide a balanced system having substantially the same mass distribution, moments of inertia, and elastic moduli about bending axes W-W and W'-W', respectively. In the present example, where the drive mode is the first out of phase bending mode, the conduits 130 and 130' are driven by the driver 180 in opposite directions about their respective bending axes W-W and W'-W'. A drive signal in the form of an alternating current can be provided by one or more meter electronics 20, such as for example via a pathway, and passed through the coil to cause both conduits 130, 130' to oscillate. Those of ordinary skill in the art will appreciate that other drive modes may be used within the scope of the present invention.

The meter assembly 10 shown includes a pair of pickoffs 170l, 170r that are affixed to conduits 130, 130'. More particularly, a first pickoff component is located on conduit 130 and a second pickoff component is located on conduit 130'. In the embodiment depicted, the pickoffs 170l, 170r may be electromagnetic detectors, for example—pickoff magnets and pickoff coils that produce pickoff signals that represent the velocity and position of the conduits 130, 130'. For example, the pickoffs 170l, 170r may supply pickoff signals to the one or more meter electronics via left and right sensor signals 165l, 165r. Those of ordinary skill in the art will appreciate that the motion of the conduits 130, 130' is proportional to certain characteristics of the flowing material, for example, the mass flow rate and density of the material flowing through the conduits 130, 130'.

It should be appreciated that while the meter assembly 10 described above comprises a dual flow conduit flowmeter, it is well within the scope of the present invention to implement a single conduit flowmeter. Furthermore, while the conduits 130, 130' are shown as comprising a curved flow conduit configuration, the present invention may be implemented with a flowmeter comprising a straight flow conduit configuration. Therefore, the particular embodiment of the meter assembly 10 described above is merely one example and should in no way limit the scope of the present invention.

In the example shown in FIG. 2, the one or more meter electronics 20 receive the pickoff signals from the pickoffs 170l, 170r. Communication path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, and other information. More particularly, the one or more meter electronics 20 receive one or more signals, for example, from pickoffs 170l, 170r and one or more temperature sensors 190, such as a resistive temperature device (RTD), and use this information to measure a characteristic of a flowing material. In the embodiment shown in FIG. 2, the meter electronics 20 receives a temperature signal 195 from the temperature sensor 190.

Coriolis flowmeters typically include a presence of a zero offset, which is the measured time delay of the pickoffs 170l, 170r at zero fluid flow. The zero offset can be compensated for by measuring an initial zero offset ($\Delta t_0$) during an initial calibration process, which usually involves closing valves and providing a zero flow reference condition. Once an initial zero offset is determined, during operation, flow measurements are adjusted by subtracting the initial zero offset from the measured time difference according to equation[1].

$$\dot{m} = FCF\ (\Delta t_{measured} - \Delta t_0) \qquad [1]$$

Where:
m̊=mass flow rate
FCF=Flow calibration factor
$\Delta t_{measured}$=measured time delay
$\Delta t_0$=initial zero offset It should be appreciated that equation [1] is merely provided as an example and should in no way limit the scope of the present invention.

The vibratory meter 5 shown in FIG. 2 directly measures a mass of a material in the conduits 130, 130'. Accordingly, the measured mass flow rate is not affected by buoyancy effects. A totalized mass value, such as a total of the measured mass flow rate of the material that flowed through the vibratory meter 5, may be equivalent or equal to the material being measured on a weight scale in vacuum. However, the mass of the material may be measured by the weigh scale in, for example, normal conditions where the surrounding fluid is air. Accordingly, buoyancy effects may cause a small but measurable difference in a totalized mass value and the mass indicated by a weigh scale used in air.

The terms "mass in vacuum" and "mass in air" are adopted in measurement standards to help record and communicate the difference between scale readings that are corrected for buoyancy or not. NIST Handbook 44 (HB44) requires that mass meters indicate in units of mass on the basis of apparent mass versus a density of 8.0 g/cm³. This means to say that it is assumed the Coriolis mass meter indication will match a weigh scale indication that has not been corrected for buoyancy effects, as long as the mass standards that were used to calibrate the scale had a density of 8.0 g/cm³. However, in many transfers of material, this assumption may result in a totalization of the directly measured mass flow rate that does not match a gravimetric measurement of the material (the total amount transferred) because the gravimetric measurement of the material is uncorrected for the buoyancy effect of air.

Example of Calculating a Mass Value

A mass value may be calculated by, for example, using a continuous density measurement from the Coriolis meter to automatically apply a correction to directly measured mass flow rates and total measurements (e.g., mass in vacuum) into a mass value including a buoyancy of a fluid, such as a mass of the material in air versus a mass of a steel calibration mass standard density of 8.0 g/cm³ units in air. For example, the apparent mass (e.g., mass in air) could be automatically and/or continuously converted from the directly measured mass flow rate using equation [2] below to indicate accumulated apparent mass total:

$$\text{Mass}_{apparent} = \left[ \frac{1 - (\rho_{air}/\rho_{material})}{1 - (\rho_{air}/\rho_{calibration\ mass\ standard})} \right] \times \text{Mass}_{true} \qquad [2]$$

Where:
$\text{Mass}_{apparent}$ is the apparent mass or mass in air of the material, which is the desired output indication of the mass total measured by the meter that would match a scale reading as uncorrected for the effect of buoyancy, such as, for example, the weigh scale reading shown in FIG. 1B;
$\text{Mass}_{true}$ is the true mass total of directly measured mass flow rates measured by the meter which would match a scale reading corrected for the effect of buoyancy, such as, for example, a weigh scale reading of a weigh scale in a vacuum where there is no buoyancy effect;
$\rho_{air}$ is a density of the air surrounding the weigh scale at, for example, the ambient conditions during the time the meter is tested against the weigh scale;
$\rho_{material}$ is a density of the material passing through the meter as measured by, for example, a Coriolis meter at the same time the true mass total $\text{Mass}_{true}$ is measured; and
$\rho_{calibration\ mass\ standard}$ is the density of the material used to fabricate the calibration mass standard that is used to calibrate the weigh scale.

The $\rho_{material}$ may be dynamic input to the calculation. The $\rho_{calibration\ mass\ standard}$ may be a fixed constant value set as a default of 8.0 g/cm³. The $\rho_{calibration\ mass\ standard}$ value may be adjusted, for example, if a calibration mass standard with a density different than 8.0 g/cm³ is used to calibrate the weigh scale. Additionally or alternatively, the operator can enter any value for the density of the mass standards that were used to calibrate the scale, but the default value and the value that may be required for NIST HB44 compliance may be 8.0 g/cm³, although any suitable units may be employed.

The density of the air $\rho_{air}$ surrounding the weigh scale may also be an operator-entered value that can be left as default or fine-tuned for more accurate conversion. For example, the density of surrounding air may be estimated with sufficient accuracy to perform this conversion. The estimate of the density of air can be refined further by considering such factors as altitude, barometric pressure, air temperature, relative humidity, etc. Additionally or alternatively, this value could also be made a dynamic input to the calculation by performing live measurements that would update the air density as conditions change.

As previously mentioned, the calculations performed using the above equation [2] may be updated continuously. For example, during a bunker transfer the density of the fluid may vary. Accordingly, the value of the measured density may vary during repeated calculations using equation [2]. For example, the value of the measured density of the material $\rho_{material}$ may be continuously updated during the repeated calculations using equation [2]. In this example, the true mass total $\text{Mass}_{true}$ and the apparent mass total $\text{Mass}_{apparent}$ may be cumulatively updated during the bunker transfer. That is, the directly measured mass flow rate of the fluid being transferred may be added to the mass value of the true mass total $\text{Mass}_{true}$ as the measurements are made. Substantially simultaneously, the density of the material $\rho_{material}$ may also be determined by using, for example, the resonant frequency of the vibratory meter. This value of the measured density of the material $\rho_{material}$ may be used to cumulatively calculate the apparent mass total $\text{Mass}_{apparent}$ contemporaneously to the cumulative calculation of the value of the true mass total $\text{Mass}_{true}$. Additionally or alternatively, the density of the air $\rho_{air}$ surrounding the weigh scale may also be continuously updated by, for example, providing air density measurements to an electronics. Continuously updated values of the measured density of the material $\rho_{material}$ and the measured density of the air $\rho_{air}$ may comprise an average of measurements made contemporaneously to the mass flow rate measurements, although any suitable values may be employed.

As an example, in the case where a fluid such as water, with density close to 1.0 g/cm³, were used to test the meter, the conversion of the true mass value to the apparent mass value would be as shown in equation [3].

$$\text{Mass}_{apparent} = \left[\frac{1 - (0.0012/1.0)}{1 - (0.0012/8.0)}\right] \times \text{Mass}_{true} = 0.99895 \times \text{Mass}_{true} \quad [3]$$

From this example, it is seen that the conversion factor of 0.99895 for water would result in the apparent mass indication that would be 0.105% smaller than the true mass that was measured by the Coriolis meter. For fluids of different densities, the conversion factor will always remain less than 1.0000 and the conversion factor will decrease as the fluid density decreases. The difference between the true mass and the apparent mass will thus increase as fluid density decreases.

Advantageously, operators can use the indication of apparent mass to calibrate the meter against a weigh scale without having to apply any correction for the effect of buoyancy on the weigh scale reading. The meter can then be used with confidence to indicate in both direct mass (e.g., mass in vacuum) and/or in apparent mass simultaneously based on the calibration of the meter against the weigh scale that was done using apparent mass units.

Another Example of Calculating a Mass Value

In addition to indicating apparent mass total, it is also possible to also indicate in units of apparent mass flow rate at any given time by applying the same conversion factor from equation [2] to the instantaneous true mass flow rate. In this example, the density readings are used to convert the directly measured mass flow rate into an apparent mass flow rate. For example, the following equation [4] may be used:

$$\dot{m}_{apparent} = \left[\frac{1 - (\rho_{air}/\rho_{fluid})}{1 - (\rho_{air}/\rho_{calibration\ mass\ standard})}\right] \times \dot{m}_{true} \quad [4]$$

Where:
$\dot{m}_{apparent}$ is an apparent mass flow rate that is the desired output indication of the mass flow rate measured by the meter that when totalized would be an apparent mass total value that would match the scale reading of a weigh scale as uncorrected for the effect of buoyancy;
$\dot{m}_{true}$ is the directly measured mass flow rate by the meter that when totalized would be a true mass total value that would match a scale reading of the weigh scale corrected for the effect of buoyancy;
$\rho_{air}$ is a density of the air surrounding the weigh scale at, for example, the ambient conditions during the time the meter is tested against the scale;
$\rho_{material}$ is the density of the material passing through the meter as measured by, for example, the Coriolis meter at the same time directly measured mass flow rate $\dot{m}_{true}$ is measured; and
$\rho_{calibration\ mass\ standard}$ is the known density of the material used to fabricate the calibration mass standard that is used to calibrate the weigh scale.

As can be appreciated, other ways of calculating a mass value may be employed. The mass value may be calculated using various electronics, an example of which is described in the following.

As can be appreciated, the above equations [2] and [4] may be modified. For example, the density of the air $\rho_{air}$ may be replaced by, for example, a value determined based on the ideal gas law. This value may be based on a barometric pressure, temperature, and the specific gas content of dry air. Alternatively, other values may be employed, such as values that have been correlated with the density of the air $\rho_{air}$ (e.g., altitude, global positioning system (GPS) coordinates, date, ambient conditions, etc.).

Accordingly, these other values may be measured and used to determine the mass value including the buoyancy of the fluid, such as air.

Figure 3:
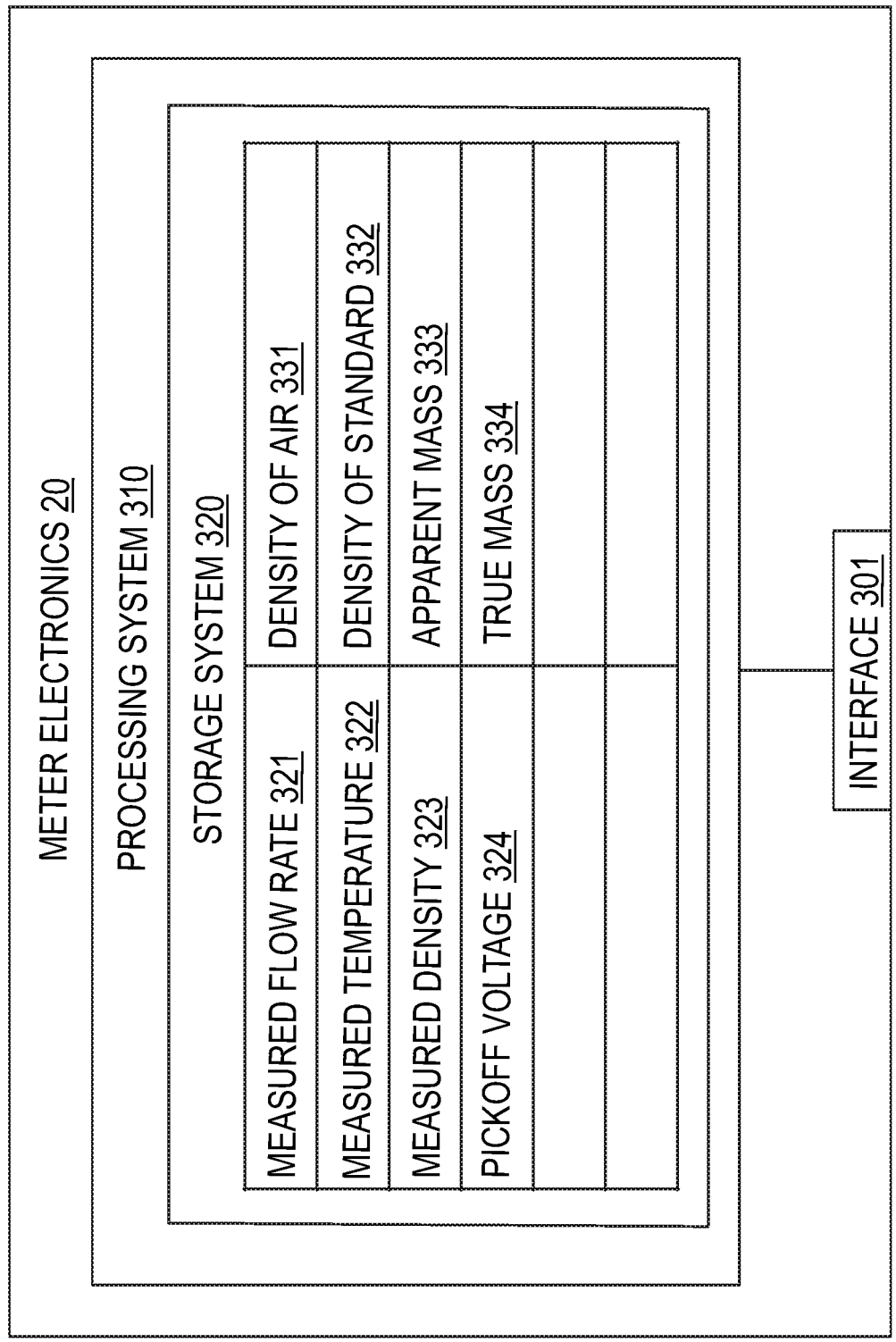
FIG. 3 shows the meter electronics 20 being configured to convert a directly measured mass flow rate to account for buoyancy.

FIG. 3 shows the meter electronics 20 being configured to convert a directly measured mass flow rate to account for buoyancy. As shown in FIG. 3, the meter electronics 20 includes a processing system 310 and a storage system 320. The processing system 310 is shown as including the storage system 320, although the storage system 320 may be separate and distinct from the processing system 310 in alternative embodiments. The storage system 320 is shown as including stored values. An interface 301 is communicatively coupled with the processing system 310.

With reference to FIG. 2, the interface 301 may be configured to couple to the leads 100 and exchange signals with the driver 180, pickoffs 170*l*, 170*r*, and temperature sensors 190, for example. The interface 301 may be further configured to communicate over the communication path 26, such as to external devices. The external device may include a density meter that is configured to measure the same fluid as the vibratory meter 5. The processing system 310 can comprise any manner of processing system. The processing system 310 is configured to retrieve and execute stored routines in order to operate the vibratory meter 5.

The meter electronics 20 or, more particularly, the processing system 310, can perform a method, such as methods herein described. For example, the meter electronics 20 can measure the flow rate of the material in the vibratory meter 5 using the left and right sensor signals 165*l*, 165*r* provided by the meter assembly 10.

The storage system 320 is shown as storing a measured flow rate 321, a measured temperature 322, a measured density 323, a pickoff voltage 324, a density of air 331, a density of a standard 332, an apparent mass 333, and a true mass 334. The measured flow rate 321 may be a directly measured flow rate and may therefore be unaffected by buoyancy. For example, the measured flow rate 321 may be a flow rate measured by the vibratory meter 5 described above with reference to FIG. 2. As explained above, and described in more detail in the following, the measured density 323 can be used to convert the measured flow rate 321 into a mass value that accounts for buoyancy. The mass value may be the apparent mass 333 shown in FIG. 3. To convert the measured flow rate 321 to the apparent mass 333, the measured flow rate 321 may be totalized to the true mass 334 as described above. Accordingly, the meter electronics 20 may be configured to execute various methods, an example of which is described in more detail in the following.

Figure 4:
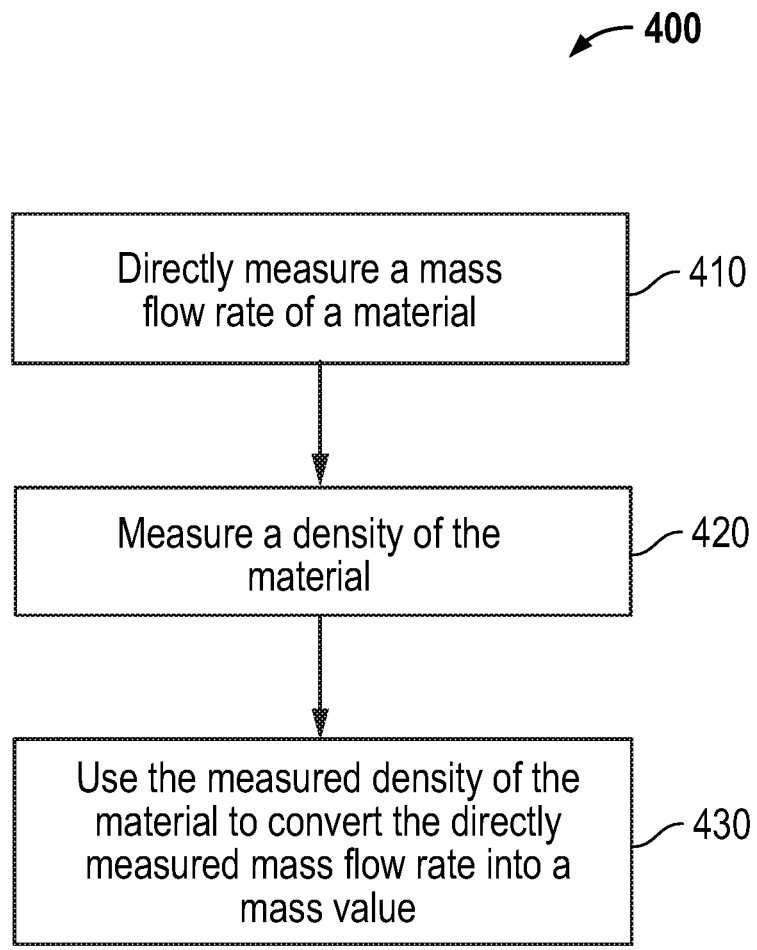
FIG. 4 shows a method 400 of converting a directly measured mass flow rate to account for buoyancy.

FIG. 4 shows a method 400 of converting a directly measured mass flow rate to account for buoyancy. As shown in FIG. 4, the method 400 includes directly measuring a mass flow rate of a material in step 410. In step 420, the method 400 measures a density of the material. The method 400 uses the measured density of the material to convert the directly measured mass flow rate into a mass value in step 430. The mass value may include or account for a buoyancy of a fluid.

In step 410, the mass flow rate of the material may be measured by, for example, the vibratory meter 5 shown in FIG. 2, although any suitable means for directly measuring the mass flow rate may be employed. Due to being directly measured, the mass flow rate value may be a true mass flow rate value. That is, there may be no buoyancy effect included in the measured mass flow rate value. Accordingly, a mass value determined from totalizing a plurality of the measured mass flow rate values is substantially equal to a mass value that does not include the buoyancy of the fluid.

In step 420, the method 400 may measure the density using, for example, the vibratory meter 5 shown in FIG. 2. Alternatively, the density may be measured by a density meter that is not the vibratory meter 5. For example, the density meter may be communicatively coupled to the vibratory meter 5 and provide the measured density to the vibratory meter 5. Various other configurations may be employed.

In step 430, using the measured density of the material to convert the directly measured mass flow rate into the mass value may comprise totalizing a plurality of the directly measured mass flow rates of the material and using the measured density of the material to convert the totalized directly measured mass flow rates to the mass value including the buoyancy of the fluid. For example, the mass flow rate may be totalized into a true mass value, such as the true mass value $Mass_{true}$ discussed above. Alternatively, the measured density may be used to convert one or more of the directly measured mass flow rates into one or more apparent mass flow rate values and totalizing the one or more apparent mass flow rate values to the mass value including the buoyancy of the fluid.

The true mass value $Mass_{true}$ and the directly measured mass flow rate do not reflect the buoyancy of the fluid and, therefore, are equivalent to a gravimetric measurement performed in a vacuum on a weigh scale. Accordingly, the true mass value $Mass_{true}$ and the directly measured mass flow rate $\dot{m}_{true}$ may be substantially the same as a corrected weigh scale mass value that does not include the buoyancy of the fluid. Conversely, the apparent mass total $Mass_{apparent}$ and the apparent mass flow rate value $\dot{m}_{apparent}$ are the same as a mass total and mass flow rate value, respectively, determined by a weigh scale that is uncorrected for and includes the buoyancy of the fluid.

As discussed above, the density of the material may be measured by, for example, the vibratory meter 5 described above with reference to FIG. 2. That is, the vibratory meter 5 may substantially simultaneously measure the mass flow rate and the density of the material flowing through the vibratory meter 5. Advantageously, this may ensure that density of the material is measured contemporaneously as the direct measurement of the mass flow rate of the material. Alternatively, the density of the material may be measured by a density meter at about the same time the vibratory meter 5, or other suitable meter, measures a mass flow rate of the material flowing through the vibratory meter 5. In this embodiment, the density may still be measured contemporaneously as the directly measured mass flow rate. Alternatively, the measurements may be temporally associated using, for example, a delay.

Figure 5:
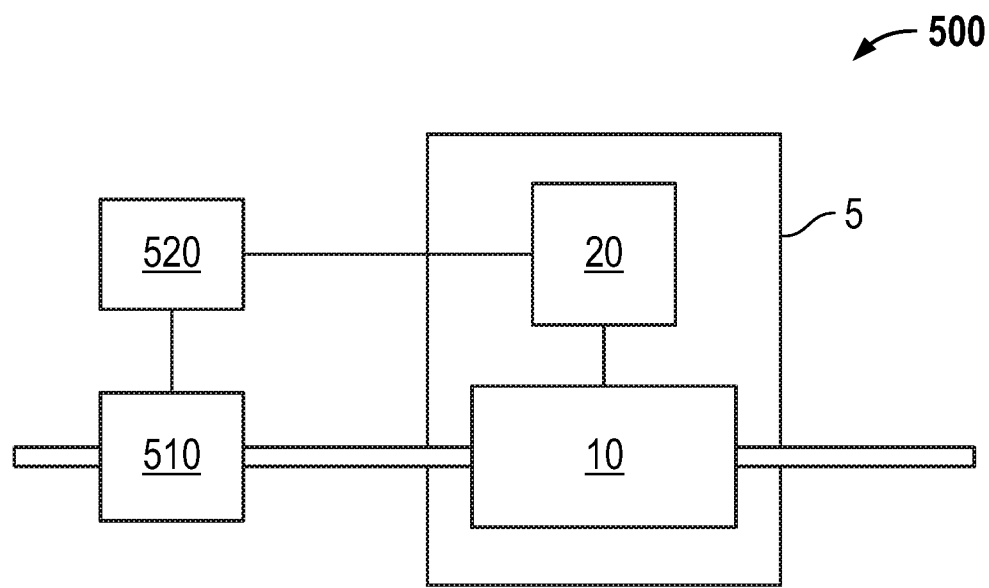
FIG. 5 shows a system 500 for converting a directly measured mass flow rate to account for buoyancy.

FIG. 5 shows a system 500 for converting a directly measured mass flow rate to account for buoyancy. As shown in FIG. 5, the system 500 includes the vibratory meter 5 described above with reference to FIG. 2. The vibratory meter 5 is shown as including the meter assembly 10 and the meter electronics 20 described with reference to FIG. 2. The vibratory meter 5 is configured to directly measure a mass flow rate of a material flowing through the vibratory meter 5.

The meter electronics 20 shown in FIG. 5 is communicatively coupled to a density meter electronics 520 that is communicatively coupled with a density transducer 510. The density transducer 510 is configured to measure a density of the material flowing through the vibratory meter 5. The density transducer 510 provides a signal to the density meter electronics 520, which may convert the signal into a density reading. Alternatively, the density meter electronics 520 may pass the signal provided by the density transducer 510 to the meter electronics 20 of the vibratory meter 5. The density meter electronics 520 and/or the meter electronics 20 may be configured to temporally associate the density measurement with the directly measured mass flow rate.

As discussed above, the density of the fluid surrounding a weigh scale may be measured as the Coriolis flow meter measures a mass flow rate so as to continuously update, for example, an apparent mass $Mass_{apparent}$. An exemplary system performing such functions is described below.

Figure 6:
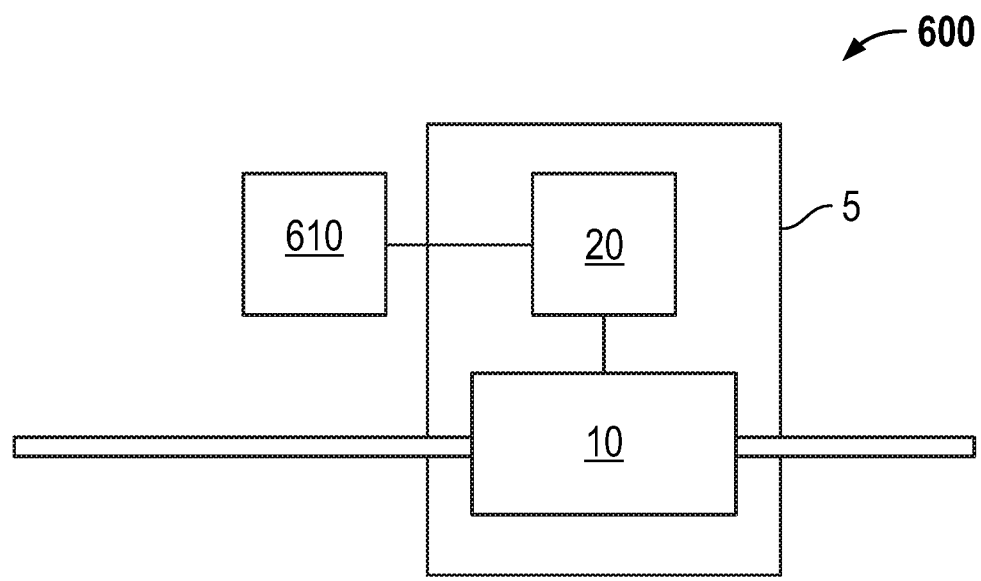
FIG. 6 shows a system 600 for converting a directly measured mass flow rate to account for buoyancy.

FIG. 6 shows a system 600 for converting a directly measured mass flow rate to account for buoyancy. As shown in FIG. 6, the system 600 includes the vibratory meter 5 described above with reference to FIG. 2. The vibratory meter 5 is shown as including the meter assembly 10 and the meter electronics 20 described with reference to FIGS. 2 and 3. The meter electronics 20 shown in FIG. 6 is communicatively coupled to a fluid sensor 610.

The fluid sensor 610 is configured to measure a pressure, such as a barometric pressure of a fluid that, for example, surrounds or is proximate to a weigh scale. In one example, the fluid sensor 610 may be disposed proximate to a weigh scale configured to gravimetric ally measure a mass of the material measured by the vibratory meter 5. The fluid sensor 610 may provide a signal reflecting the pressure to the vibratory meter 5, in particular, the meter electronics 20. Using the measured pressure, the meter electronics 20 may be configured to, for example, continuously update a density value of the fluid, such as air, surrounding the weigh scale. The density of the fluid may be a density of air $\rho_{air}$.

The above describes the meter electronics 20, method 400, and systems 500, 600 as converting a directly measured mass flow rate to account for buoyancy. The directly measured mass flow rate of the material may be converted to a mass value that includes the buoyancy of the fluid by using a measured density of the material. The measured density of the fluid that, for example surrounds a weigh scale may also be used. The density of the fluid that may surround the weigh scale may be determined by, for example, measuring a barometric pressure and providing the measured barometric pressure to the meter electronics 20. The density of the material may be measured contemporaneously as the mass flow rate of the material. Additionally or alternatively, the density of the fluid that causes the buoyancy effect may also be measured and/or determined contemporaneously or temporally associated with the direct measurement of the mass flow rate and/or the measurement of the density of the material. As a result of each of the foregoing features, alone or in combination with each other, the mass value that includes the buoyancy of the fluid may be accurately compared to the gravimetrically measured mass value. That is, the mass value that accounts for the buoyancy of the fluid may be expected to be equal to the gravimetrically measured mass value.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other conversions of a directly measured mass flow rate to account for buoyancy and not just to the embodiments described above and shown in the accompanying figures. Accordingly, the scope of the embodiments described above should be determined from the following claims.

I claim:

1. A method of converting a directly measured mass flow rate to account for buoyancy, the method comprising:
   directly measuring a mass flow rate of a material;
   measuring a density of the material; and
   using the measured density of the material to convert the directly measured mass flow rate into a mass value including a buoyancy of a fluid.

2. The method of claim 1, further comprising using a density of the fluid to convert the directly measured mass flow rate into the mass value including the buoyancy of the fluid.

3. The method of claim 1, wherein the mass value including the buoyancy of the fluid comprises an indication by a weigh scale that has been calibrated using a mass standard in the fluid.

4. The method of claim 3, wherein the mass standard is comprised of at least one of steel and a material that has the density of about 8.0 g/cm$^3$.

5. The method of claim 1, wherein the mass value including the buoyancy of the fluid comprises the mass value being uncorrected for the buoyancy of the fluid in which the mass value is gravimetrically determined.

6. The method of claim 1, wherein using the measured density of the material to convert the directly measured mass flow rate into the mass value including the buoyancy of the fluid comprises one of:
   totalizing a plurality of the directly measured mass flow rates of the material and using the measured density of the material to convert the totalized directly measured mass flow rates to the mass value including the buoyancy of the fluid; and
   using the measured density of the material to convert one or more of the directly measured mass flow rates into one or more mass flow rate values including the buoyancy of the fluid.

7. The method of claim 6, wherein using the measured density of the material to convert the one or more directly measured mass flow rates into the one or more mass flow rate values further comprises totalizing the one or more mass flow rate values to the mass value including the buoyancy of the fluid.

8. The method of claim 1, wherein the buoyancy of the fluid is a buoyancy of air.

9. The method of claim 1, wherein a Coriolis flow meter measures at least one of the mass flow rate and the density of the material.

10. A meter electronics (20) configured to convert a directly measured mass flow rate to account for buoyancy, the meter electronics (20) comprising:
    an interface (301) configured to receive sensor signals from a meter assembly (10);
    a processing system (310) communicatively coupled to the interface (301), the processing system (310) being configured to:
    directly measure a mass flow rate of a material in the meter assembly (10) based on the received sensor signals;
    determine a density of the material; and
    use the determined density of the material to convert the directly measured mass flow rate into a mass value including a buoyancy of a fluid.

11. The meter electronics (20) of claim 10, wherein the processing system (310) is further configured to use a density of the fluid to convert the directly measured mass flow rate into the mass value including the buoyancy of the fluid.

12. The meter electronics (20) of claim 10, wherein the processing system (310) being configured to determine the density of the material comprises the processing system (310) being configured to one of:
    receive a density measurement from a densitometer communicatively coupled to the interface (301); and
    measure a density of the material based on the received sensor signals.

13. The meter electronics (20) of claim 10, wherein the mass value including the buoyancy of the fluid comprises an indication by a weigh scale that has been calibrated using a mass standard in the fluid.

14. The meter electronics (20) of claim 13, wherein the mass standard is comprised of at least one of steel and a material that has the density of about 8.0 g/cm$^3$.

15. The meter electronics (20) of claim 10, wherein the mass value including the buoyancy of the fluid comprises the mass value being uncorrected for the buoyancy of the fluid in which the mass value is gravimetrically measured.

16. The meter electronics (20) of claim 10, wherein the processing system (310) being configured to use the determined density of the material to convert the directly measured mass flow rate into the mass value including the buoyancy of the fluid comprises the processing system (310) being configured to one of:
    totalize a plurality of the directly measured mass flow rates of the material and use the measured density of the material to convert the totalized directly measured mass flow rates to the mass value including the buoyancy of the fluid; and
    use the determined density of the material to convert one or more of the directly measured mass flow rates into one or more mass flow rate values including the buoyancy of the fluid.

17. The meter electronics (20) of claim 16, wherein the processing system (310) being configured to use the measured density of the material to convert the one or more directly measured mass flow rates into the one or more mass flow rate values including the buoyancy of the fluid further comprises totalizing the one or more mass flow rate values to the mass value.

18. The meter electronics (20) of claim 10, wherein the buoyancy of the fluid is a buoyancy of air.

19. The meter electronics (20) of claim 10, wherein a Coriolis flow meter includes the meter electronics (20).

20. A system (600) for converting a directly measured mass flow rate to account for buoyancy, the system (600) comprising:
    a fluid sensor (610) configured to measure one of a pressure and a density of a fluid;

a vibratory meter (5) communicatively coupled to the fluid sensor (610), the vibratory meter (5) being configured to:
  directly measure a mass flow rate of a material;
  determine a density of the material; and
  use the determined density of the material to convert the directly measured mass flow rate into a mass value including a buoyancy of the fluid.

21. The system (600) of claim 20, wherein the meter (5) is further configured to use the density of the fluid to convert the directly measured mass flow rate into the mass value including the buoyancy of the fluid.

22. The system (600) of claim 20, wherein fluid sensor (610) is disposed proximate a weigh scale configured to measure a mass of the material measured by the vibratory meter (5).

23. The system (600) of claim 20, wherein the fluid surrounds a weigh scale configured to measure a mass of the material measured by the meter (5).

* * * * *